Patented Apr. 22, 1952

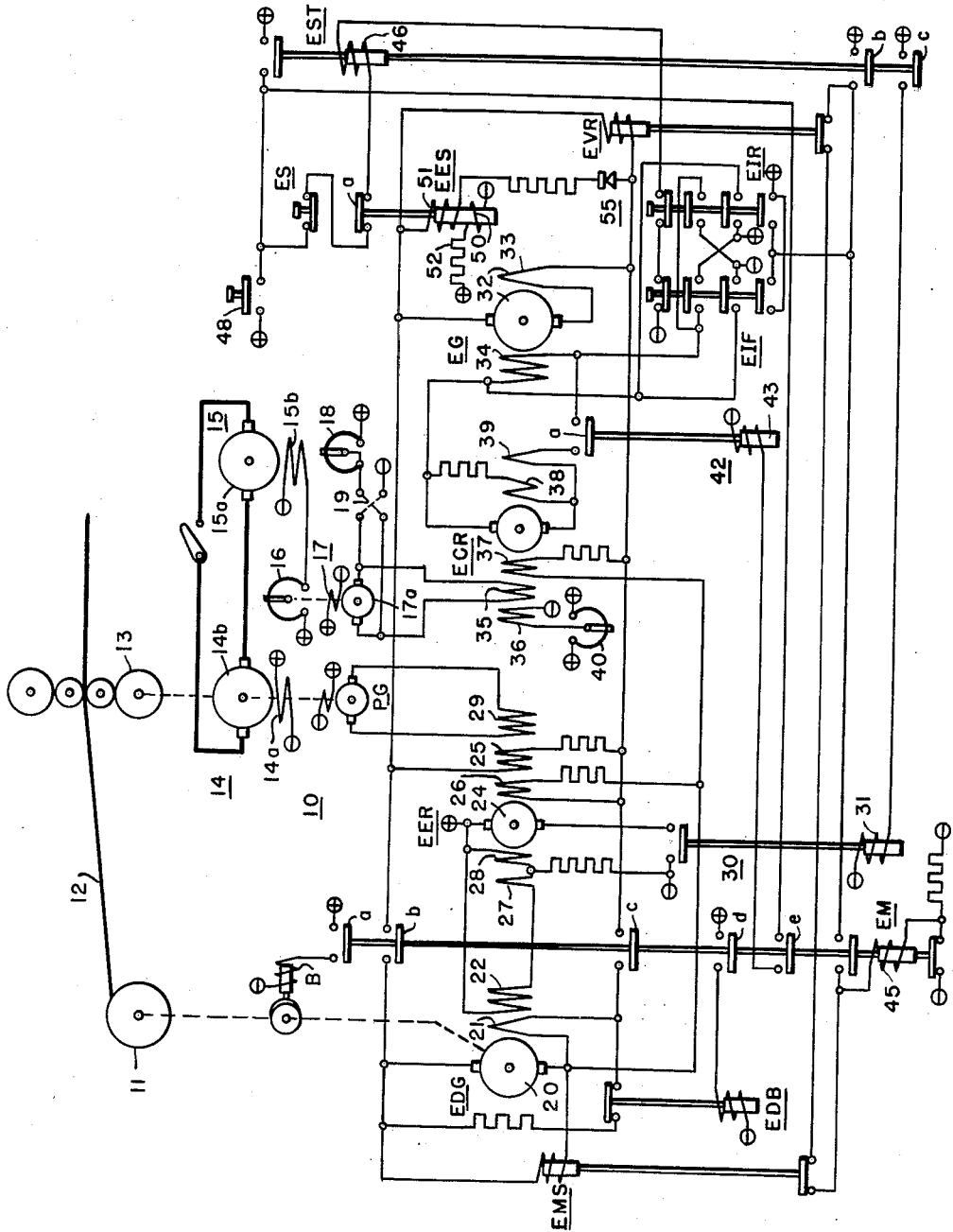

2,594,035

UNITED STATES PATENT OFFICE 2,594,035

REEL CONTROL SYSTEM

William D. King, Buffalo, and Amos J. Winchester, Jr., Lockport, N. Y., assignors to Westinghouse Electric Corporation, East Pittsburgh, Pa., a corporation of Pennsylvania Application July 26, 1949, Serial No. 106,938

11 Claims. (Cl. 80—32)

Our invention relates, generally, to reel control systems, and it has reference in particular to control systems such as may be used with drag generators on entry reels in strip mills or the like.

Generally stated, it is an object of our invention to provide a control system for drag generators that is simple and inexpensive to manufacture, and is reliable and effective in operation.

More specifically it is an object of our invention to provide, in a reel control system, for quickly and safely bringing an entry reel to a stop in the event of breakage of a strip being unwound therefrom.

Another object of our invention is to provide, in a control system for an entry reel, for preventing reverse operation of a drag generator connected in driving relation with the reel, in the event of a break in a strip of material which is being unwound from the reel.

It is another object of our invention to provide, in a reel control system, for utilizing a reversal of the terminal voltage of a reel generator connected in circuit relation with a drag generator when a strip being uncoiled from an entry reel breaks, to effect disconnection of the drag generator from the reel generator.

It is also an object of our invention to provide, in a control system for an entry reel, for effecting disconnection of a drag generator from a reel generator when the terminal voltage of the reel generator reverses, so as to bring the drag generator to a stop by dynamic braking.

An important object of our invention is to provide, in control system for a dynamoelectric machine connected in driving relation with a reel device, for effecting inertia compensation in accordance with the rate of change of speed of a work device operating on a strip of material being handled by the reel device.

Other objects will, in part be obvious and will, in part, be explained hereinafter.

In practicing our invention, in one of its forms, the armature of a drag generator connected to an entry reel, is connected in circuit relation with the armature of a reel generator whose field excitation is supplied from a current regulating generator responsive to the armature current of the drag generator. A polarized relay connected across the armature of the reel generator operates when the terminal voltage of the reel generator reverses, so as to disconnect the current regulating generator and interrupt the circuit between the reel generator and the drag generator. The drag generator field excitation is supplied by a regulating generator which is responsive to a differential between the drag generator E. M. F. and a voltage derived from a pilot generator connected to a mill stand, which is indicative of the speed of the strip being unwound from the reel. The connection of this regulating generator and the field winding is interrupted upon operation of the polarized relay. The drag generator is then slowed down by dynamic braking and brought to a stop by means of a brake device.

For a more complete understanding of the nature and scope of our invention, reference may be made to the following detailed description, which may be read in connection with the accompanying drawing, in which the single figure is a diagrammatic view of an entry reel control system embodying the invention in one of its forms.

Referring to the drawing, the reference numeral 10 may denote, generally, a control system for an entry reel 11, from which a strip of material 12 is disposed to be uncoiled to pass through the rolls of a mill stand 13, driven by means of a roll motor 14.

The roll motor 14 may comprise a field winding 14a, which may be energized from a suitable source of electrical energy, and an armature 14b. The armature may be supplied with electrical energy from a main generator 15 comprising an armature 15a and a field winding 15b. The speed of the motor 14 may be varied by variably energizing the generator field winding 15b from a suitable source through a rheostat 16 operated by a rheostat motor 17 energized from a reversible variable voltage source represented by the rheostat 18 and reversing switch 19.

The entry reel 11 may be provided with an entry drag generator EDG, having an armature 20 connected in driving relation with the reel, a commutating field winding 21 and a separately excited shunt field winding 22. In order to provide a substantially constant E. M. F. for varying speeds of the reel 11 as the strip 12 is unwound therefrom, energization of the field winding 22 may be supplied from an entry E. M. F. regulating generator EER having an armature 24, a voltage field winding 25, a current field winding 26, a self energizing field winding 27, an anti-hunt field winding 28, and a pattern field winding 29.

The armature 24 of the regulating generator EER may be connected in circuit relation with the field winding 22 by means of a control switch 30 having an operating winding 31. The self-energizing field winding 27 may be connected in series circuit relation with the armature 24 and the field winding 22, so as to provide compensation for the airgap M. M. F. losses of the regulating generator. The anti-hunt field winding 28 may be connected in shunt circuit relation with the armature 24. The pattern field winding 29 may be energized from a pilot generator PG connected in driving relation with the roll motor 14 and which provides a measure of the strip speed. The voltage field winding 25 may be connected across the armature of the drag generator EDG, and the current field winding 26 may be connected across the commutating field winding 21 of the drag generator so that the windings 25 and 26 jointly provide a measure of the E. M. F. or speed of the drag generator in the opposition to the M. M. F. of the pattern field winding 29.

The armature 20 of the drag generator EDG may be connected in circuit relation with the armature 32 of an entry reel generator EG having a commutating field winding 33 and a separately excited shunt field winding 34. The shunt field winding 34 may be normally supplied with electrical energy from an entry reel current regulating generator ECR having an inertia compensation field winding 35, a pattern field winding 36, a differential current field winding 37, an anti-hunt field winding 38, and a self-energizing field winding 39. The pattern field winding 36 may be connected to a suitable source of electrical energy through an adjustable rheostat 40, while the current field winding 37 may be connected across the commutating field winding 21, so as to provide a measure of the drag generator armature current. The inertia compensation field winding 35 may be connected across the armature 17a of the rheostat motor 17. The anti-hunt field winding 38 may be connected in shunt circuit relation with the armature of the regulating generator ECR, while the self-energizing field winding 39 may be connected in series circuit relation with the shunt field winding 34 of the reel generator through a control switch 42 having an operating winding 43.

The reel generator EG may be connected to the armature of the drag generator by means of a main switch EM having an operating winding 45. A start relay EST, having an operating winding 46, may be provided for energizing the operating winding 45 in response to operation of a start push-button switch 48. Overvoltage relays EMS and EVR, responsive to the armature voltages of the drag generator EDG and the reel generator EG, respectively, may be provided for preventing completion of the energizing circuit of the operating winding 45 of the main switch EM under overvoltage conditions.

In order to prevent reverse operation of the drag generator EDG as a motor, in the event that the strip 12 should break, an emergency stop relay EES may be provided, having a polarizing winding 50 and an operating winding 51. The polarizing winding 50 may be connected to a suitable source of electrical energy through a control resistor 52, so as to provide insufficient armature currents for operating the relay. The operating winding 51 may be connected across the armature 32 of the reel generator EG in series circuit relation with a rectifier device 55. The rectifier device 55 may be disposed to block the flow of current through the operating winding 51 when the terminal voltage of the reel generator EG is in the normal direction, so as to permit operation of the emergency stop relay EES, only when the terminal voltage of the reel generator EG reverses, such as would occur in the event that the strip 14 should break. An emergency stop push-button switch ES may be connected in series circuit relation with the emergency stop relay EES.

In order to provide for inching the drag generator EDG, "forward" and "reverse" push-button switches EIF and EIR may be provided for reversibly connecting the field winding 35 of the reel generator to a suitable source of electrical energy. With a view to effecting operation of the drag generator independently of the emergency stop relay EES, the push-button switches EIF and EIR may be disposed to connect the operating winding 59 of the main switch EM for energization independently of the start relay EST, so that operation of the emergency stop relay EES in response to operation of the push-button switches when inching, will not render the system inoperative.

In operation, the field strength of the entry reel drag generator EDG is determined by the E. M. F. of the entry regulating generator EER, which regulates for an E. M. F. which is proportional to the mill speed. Minimum field excitation for the drag generator is supplied from a source of control voltage represented by the positive and negative polarity symbols. The regulating generator EER supplies the additional voltage necessary to bring the drag generator EDG from a minimum to a full field condition. Whenever the E. M. F. of the drag generator is below what it should be for a given speed of the mill, the ampere turns of the pattern field 29 exceed the sum of those in the voltage and current field windings 25 and 26, and the difference is in the direction to strengthen the drag generator field. The voltage of the regulating generator EER will continue to change until the E. M. F. of the drag generator is what it should be for a given speed of the mill. When this condition is attained, the net sum of the ampere turns in the pattern field winding 29 and the voltage and current field windings 25 and 26 will be zero. At the beginning of an unwinding operation, the drag generator field is strong, and as the coil unwinds, the regulating generator EER operates to weaken the generator field, so that it maintains a drag generator E. M. F. which is proportional to the speed of the mill.

During operation, the current regulating generator ECR varies the excitation of the shunt field winding 34 of the reel generator EG so as to vary the terminal voltage of the reel generator and maintain a substantially constant value of armature current. Should the armature current increase, the excitation of the current field winding 37 increases and the voltage of the regulating generator ECR increases, thus increasing the terminal voltage of the reel generator EG and opposing the flow of current in the armature circuit, thus reducing it to the desired value.

Should the strip 12 break, the E. M. F. of the drag generator will drop rapidly, since the drag generator EDG will have lost its driving force. The current regulating generator ECR thereupon rapidly reduces the terminal voltage of the reel generator EG in an effort to maintain a substantially constant value of armature current. As the E. M. F. of the drag generator EDG continues to drop, the current regulating generator ECR will reverse the terminal voltage of the reel generator EG in an effort to maintain the armature current. As soon as this condition is obtained, the emergency stop relay EES operates, and interrupts the energizing circuit for the start relay EST at contact members (a) of relay EES. The start relay EST returns to the deenergized position, interrupting the energizing circuit of the main switch EM at contact members (b) and interrupting the energizing circuit of the switch 30 at contact members (c). The switch 30 returns to the deenergized position, disconnecting the drag generator field winding 22 from the regulating generator EER.

At the same time the main switch EM returns to the deenergized position, and disconnects the armature of the drag generator EDG from the reel generator EG at contact members (b) and (c). Contact members (a) of the main switch EM interrupt the energizing circuit of the brake device B, so that the brake is set. At the same time, the energizing circuit for the dynamic braking relay EDB is interrupted at contact members (d) so that a dynamic braking circuit is provided, and the drag generator will be gradually brought to a stop. The energizing circuit for the operating winding 43 of the control switch 42 is interrupted at contact members (e) of the main switch EM, so that the current regulating generator ECR will be disconnected from the field winding 34 of the reel generator EG at contact members (a) of switch 42.

If it is desired to inch the drag generator EDG either one of the push-button switches EIF or EIR may be actuated so as to selectively energize the field winding 34 of the reel generator EG with one polarity or the other. Operation of either of these push-button switches provide an obvious energizing circuit for the operating winding 45 of the main switch EM, so that the drag generator may be energized from the reel generator EG independently of the start relay EST. Operation of the emergency stop relay EES due to a reversal of the armature voltage of the reel generator EG will thus be prevented from rendering the main switch EM inoperative.

Whenever the speed of the mill is changed by increasing or decreasing the voltage applied to the armature 14b of the mill motor, the excitation of the inertia compensating field winding 35 will be changed in accordance with the voltage applied to the armature 17a of the rheostat motor 17. The magnetomotive force of this winding will be proportional to the rate of change of speed of the mill, and in a direction to compensate for the inertia of the moving parts of the system, so as to maintain the strip tension more uniform during changes in the speed of the mill.

From the above description and the accompanying drawing, it will be apparent that we have provided in a simple and effective manner for controlling the operation of a drag generator connected in driving relation with a reel device in a strip mill or the like. By utilizing a polarized relay, which is responsive to a reversal of the terminal polarity of the reel generator, reverse operation of the drag generator may be prevented when the terminal voltage of the reel generator reverses as a result of strip breakage. By providing for operating the main switch independently of the polarized relay, operation of the reel generator may be utilized for inching purposes without any interference in this operation from the polarized relay.

Since certain changes may be made in the above-described description, and different embodiments of the invention may be made without departing from the spirit and scope thereof, it is intended that all the matter contained in the above description and shown in the accompanying drawing, be considered as illustrative and not in a limiting sense.

We claim as our invention:

1. In a control system for a reel having a drag generator with a field winding and an armature connected in driving relation with the reel, regulating means operable to effect energization of the field winding, generating means connected in electrical energy transferring relation with the armature of the drag generator, and control means operable in response to a reversal of voltage of the generating means to effect disconnection of the drag generator and the generating means.

2. The combination with a drag generator connected in driving relation with an entry reel for delivering a strip of material, of generating means connected in circuit relation with the drag generator to maintain a predetermined value of load current therebetween, and relay means operable in response to reversal of voltage at the generating means to effect stoppage of the drag generator.

3. In combination with a drag generator connected in driving relation with a reel device, generating means, circuit means operable to connect the generating means and drag generator, regulating means connected to vary the excitation of the generating means to maintain a predetermined value of current in the circuit between the drag generator and the generating means, and control means operable in response to a reversal of voltage at the generating means to interrupt the connections of the drag generator and regulating means with the generating means.

4. In a control system for a reel device, a drag generator connected in driving relation with the reel device, generating means connected in circuit relation with the drag generator, regulating means connected to supply excitation to the generating means to maintain a predetermined value of current in the circuit between the drag generator and generating means, control means operable to provide a dynamic braking circuit for the drag generator, and relay means operable in response to a reversal of polarity at the terminals of the generating means to effect disconnection of the drag generator and regulating means from the generating means and effect operation of the control means.

5. The combination in a control system for a reel device; of a drag generator having a field winding and an armature connected in driving relation with the reel device; regulating means connected to vary the excitation of the field winding in accordance with a differential between the speed of the reel device and the speed of a strip of material being unwound therefrom; generating means connected in circuit relation with the armature, additional regulating means connected to vary the output voltage of generating means to maintain a predetermined value of current in the drag generator armature circuit; and control means operable in response to reversal of the output voltage of the generating means to effect disconnection of the regulating means from the field winding, the additional regulating means from the generating means, and of the generating means from the drag generator.

6. In combination with a drag generator having a driving connection with a reel device, brake means operable to stop the drag generator, control means operable to provide a dynamic braking circuit for the drag generator, generating means, switch means operable to connect the generating means to the drag generator, said switch means being operable to render the brake means and the control means ineffective, and relay means responsive to a reversal of terminal voltage of the generating means to render the switch means inoperative.

7. In a control system for a drag generator having a field winding and an armature connected in driving relation with a reel device, regulating means disposed to supply electrical energy to the field winding, generating means disposed to supply electrical energy to the armature of the drag generator, an additional regulating generator connected to vary the output voltage of the generating means so as to maintain a predetermined value of current in the armature circuit of the drag generator, switch means operable to connect the generating means to the drag generator armature, relay means operable to effect operation of the switch means, control means operable in response to reversal of voltage of the generating means to render the relay means inoperative, and control switch means operable to effect operation of the switch means independently of the control means.

8. In a control system for a drag generator having a field winding and an armature connected in driving relation with a reel device, generating means having an armature connected in circuit relation with the drag generator armature and a field winding, main switch means operable to connect said armatures in circuit relation, regulating means, switch means operable to connect the regulating means to effect energization of the field winding of the generating means, additional regulating means, additional switch means operable to connect the additional regulating means to effect energization of the field winding of the drag generator, relay means operable in response to reversal of the terminal voltage of the generating means to render the several switch means inoperative, and control means selectively operable to reversibly energize the field winding of the generating means and effect operation of the main switch means independently of the relay means.

9. In combination, a drag generator having a field winding and an armature connected in driving relation with a reel device for handling a moving strip of material, circuit means including a current limiting resistor connecting the field winding to a source of electrical energy for a predetermined minimum value of energization, regulating means responsive to the speed of the drag generator and the speed of the strip, control means operable to connect the regulating means for effecting energization of said field winding, generating means having an armature and a field winding, switch means operable to connect the armatures of the generating means and the drag generator in circuit relation, additional regulating means responsive to the current in said armature circuit, additional control means operable to connect the additional regulating means to effect energization of the field winding of the generating means, relay means operable in response to a reversal of voltage across the armature of the generating means to render the switch means and both of the control means inoperative, and additional switch means operable to reversibly effect energization of the field winding of the generating means and effect operation of the aforesaid switch means independently of said relay means.

10. In a control system for a dynamoelectric machine connected in driving relation with a reel device handling a strip of material passing through a work device connected in driving relation with a motor energized from a variable voltage source, means for regulating the field excitation of the dynamoelectric machine in accordance with the speed of the motor of the work device, regulating means connected to regulate the armature current of the dynamoelectric machine, inertia compensation excitation means for the regulating means, and control means operable to vary the voltage of the source and vary the energization of the inertia compensation excitation means in accordance with the direction and rate of change of the voltage of the source.

11. In a control system for a drag generator connected in driving relation with a reel device supplying a strip of material to a mill stand, a motor connected in driving relation with the mill stand, generating means disposed to supply electrical energy to the motor including a generator field rheostat actuated by a rheostat motor, circuit means connecting the rheostat motor to a reversible source of variable voltage, generating means including a regulating generator connected in electrical energy transferring relation with the drag generator, and inertia compensation excitation means on the regulating generator connected to be energized in accordance with the direction and value of voltage of the reversible source.

WILLIAM D. KING.
AMOS J. WINCHESTER, Jr.

REFERENCES CITED

The following references are of record in the file of this patent:

UNITED STATES PATENTS

| Number | Name | Date |
| --- | --- | --- |
| 2,451,901 | Auburn | Oct. 19, 1948 |